United States Patent

[11] 3,603,770

[72] Inventor Edward R. Reins, Jr.
Monterey, Calif.

[21] Appl. No. 789,168
[22] Filed Jan. 6, 1969
[45] Patented Sept. 7, 1971
[73] Assignee Trans-Controls, Inc.
Pacific Grove, Calif.

[54] TAPE BUFFER SYSTEM FOR INCREMENTAL PLOTTER
3 Claims, 7 Drawing Figs.

[52] U.S. Cl. .......... 235/151, 340/146.1, 235/151.11, 340/172.5, 340/174.1 R
[51] Int. Cl. .......... G06f 13/08, G06f 7/00
[50] Field of Search .......... 340/172.5; 235/151, 151.1, 151.11; 318/20.080

[56] References Cited

UNITED STATES PATENTS

| | | | |
|---|---|---|---|
| 2,820,187 | 1/1958 | Parsons et al. | 318/39 |
| 2,998,560 | 8/1961 | Mottu | 318/28 |
| 3,393,300 | 7/1968 | Jennings et al. | 235/151 |
| 3,404,260 | 10/1968 | Johnson, Jr. | 235/151 X |

*Primary Examiner*—Eugene G. Botz
*Attorneys*—Jack M. Wiseman and Arthur Decker

ABSTRACT: Magnetic tape buffer equipment for use between a digital computer and an incremental plotter, including a tape loop, storage and forward-reverse drive therefor, writing and reading stations and error-checking circuits operating in a system which provides for periodic checks and correction, if required, of the plotter pen position in order that errors in the plotter display are not propagated throughout the plot.

INVENTOR.
EDWARD R. REINS, JR.

BY Jack M. Wiseman

ATTORNEY

INVENTOR.
EDWARD R. REINS, JR.

BY Jack M. Wiseman

ATTORNEY

INVENTOR.
EDWARD R. REINS, JR.

BY Jack M. Weisman

ATTORNEY

INVENTOR.
EDWARD R. REINS, JR.
BY Jack M. Wiseman
ATTORNEY

TAPE BUFFER SYSTEM FOR INCREMENTAL PLOTTER

BACKGROUND OF THE INVENTION

This invention relates to magnetic tape read/write systems and, more particularly, to equipment which enable such a system to operate as a buffer between a computer or other high-speed data-generating device and an incremental plotter or other relatively slow-speed recording device.

Display units for digital computer generated data, especially those which provide visible graphs that are plotted in small increments to the coordinates, are generally capable only of receiving data at a rate far below that at which it is outputted by the computer. As a consequence, it is necessary to provide some means for speed change (buffering), either internally in the computer, usually in the form of delay lines or auxiliary recirculating memories, or externally, usually in the form of a freestanding card or magnetic tape loop storage unit. In either case, it is common practice to program the computer with a separate command directing the plotter operation corresponding to each increment of the graphical display, and each of these "increment" commands appears separately on the buffer's storage medium. Considering a plotter characterized by incremental stepping of 0.01 inch, it is thus readily seen that a great number of commands are required to present a graph of reasonable dimensions. The consequences are requirements for considerable computer operation time and large tape loops for each display. These requirements have in the past been regarded by the art as constraints sufficiently severe to justify systems which transfer data without automatic error checks and in which an error is not apparent until an entire graph is plotted; this mode of operation involves a call by the receiving site for a retransmission, which may be quite impractical in the case of a system comprising tieline communication between a centralized computer and a plurality of plotters at many receiving sites, since, in the case, all receiving sites will receive data at a rate compatible with the sum of the errors detected at all receiving sites.

BRIEF SUMMARY OF THE INVENTION

It is a general object of this invention to provide a freestanding magnetic tape loop system for speed buffering between a computer and an incremental plotter, thereby providing for graphical records of computer information.

It is a further object of this invention to provide such a system for use with a centralized computer and multiple plotters at remote locations, either connected directly to the computer or through a communications network.

It is another object of this invention to characterize such a system by data input and output simultaneously if needed, and at different rates.

The invention fulfills the above objects by incorporating a magnetic tape loop unit having separate read and write stations which operate under independent control so that recording and playback rates may be established individually. The unit stores the tape loop in a pair of bins, one feeding each station, and each bin having a capacity to store almost all of the tape loop.

It is another object of this invention to incorporate in such a system, forward-acting error-checking which automatically corrects the position of the plotter pen; it will be noted that the error-checking scheme provides several advantageous features: the amount of data needed to be transmitted to the plotter for the display of straight lines is reduced, the problem of attempting to read high bit packing density data over the spliced area of the tape loop is eliminated, errors are not propagated throughout the display, and others.

This object and its features are accomplished by operating the computer such that the sequential commands recorded on the tape loop cause the plotter to display an abscissa and ordinate (X,Y) reference point followed by increments thereto as required by the graph but interspersed by correct actual coordinates specified in a "coordinate" command. The system then compares the present plotter coordinates (i.e., the X,Y position that the pen is occupying) with the correct coordinates, and, if there is a discrepancy, the pen position is corrected by appropriate increment commands generated by the system.

It is still another object of this invention to provide a computer-plotter buffer which may also serve for bulk storage.

DESCRIPTION OF THE PREFERRED EMBODIMENT

The overall system of concern here performs broadly the following operations: records sequentially on its magnetic tape, sets of words of information (commands) transmitted by the computer under control of the latter's program, each command either directing an incremental positioning of the plotter pen (increment command) or specifying a set of coordinates representing the correct present position of residence of the pen (coordinate command); reads these words in the sequence in which they were recorded and provides the resultant signals as input to the plotter; tracks the present position of the pen, checks it against the coordinate command and, in case of discrepancy, generates correction increment commands which direct the plotter to reposition the pen at the coordinate command coordinates; and, performs a parity check on the received coordinate commands and, in the event of incorrect parity, ignores the command.

The invention is herein disclosed with reference to operative connection to a general purpose computer such as described in U.S. Pat. No. 2,954,166 and an incremental plotter such as described in U.S. Pat. No. 2,764,464 and familiarity with these devices will be presumed in order that the present description be reserved for matter encompassed by the claims.

Figure 1:
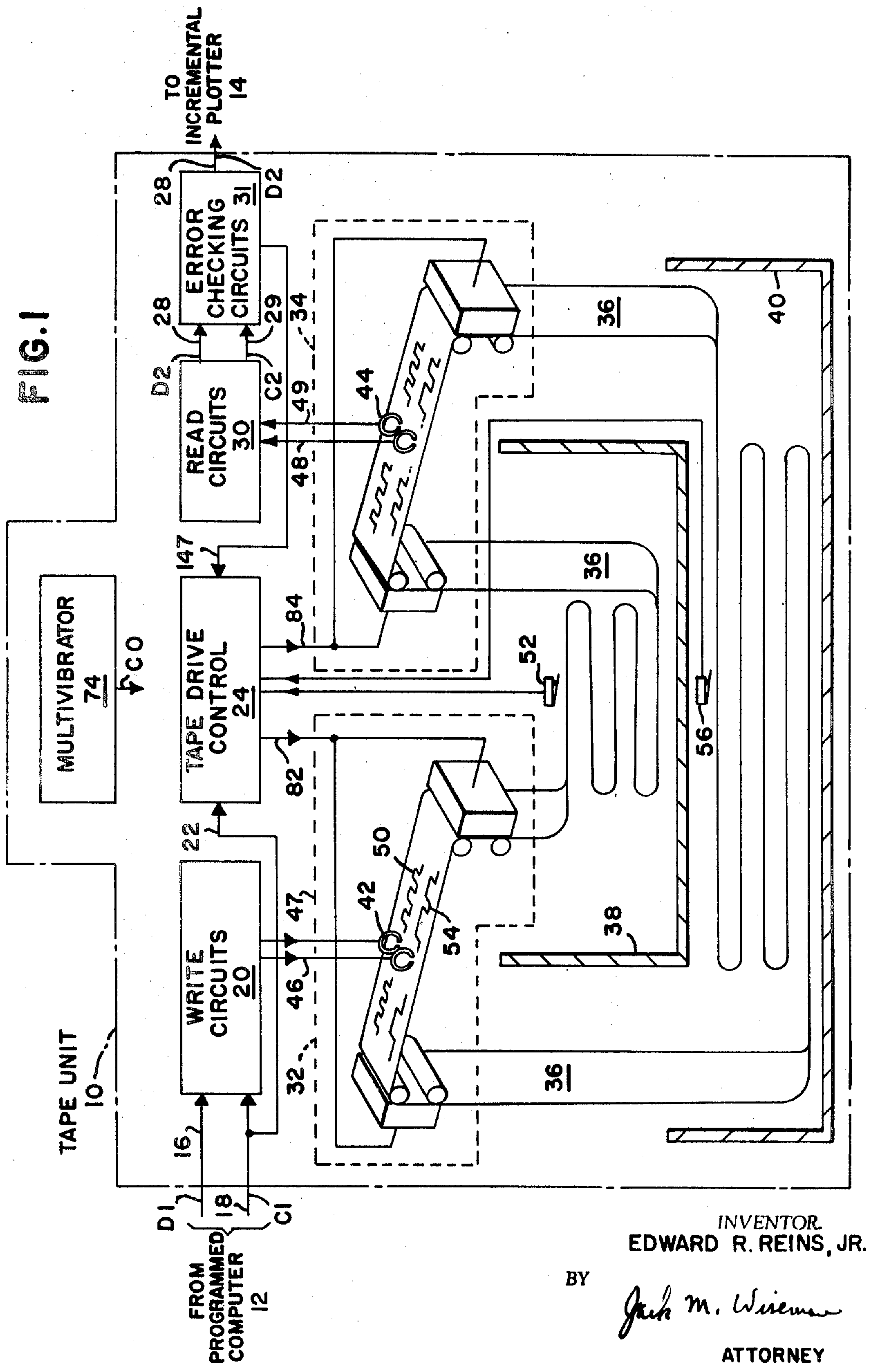
FIG. 1 is a simplified showing of the tape unit of the invention.

Referring now to FIG. 1, a general simplified diagram of the tape unit incorporating the preferred embodiment of the invention is shown as tape unit 10 connected to received input from computer 12 and to provide output to incremental plotter 14. Input comprises digital signals representing commands, designated as D1, on line 16 and a repetitive clock signal, designated as C1, on line 18; these feed to write circuits 20 and, via line 22, to drive control 24. Output comprises digital signals representing commands, designated as D2, on line 28 from error-checking circuits 31, which, through control circuitry in incremental plotter 14 (not shown) direct the activity of the pen thereof.

Tape unit 10 further includes write station 32 and read station 34 associated with tape loop 36, an endless loop of magnetic tape 0.5 inch in width and 1.5 mil in thickness closed by a splice as is known in the art. Tape loop 36 is contained in two sections, one in storage bin 38 and the other in supply bin 40, the former feeding read station 34 and the latter feeding write station 32. Although there is no constraint on the length of tape 36, the present system contemplates sufficient storage in each bin to activate its respective station for a period corresponding to operation of plotter 14 for about 1 hour; a bin storage of 1,200 feet of tape has been found quite suitable, regardless of the rate at which data is supplied by computer 12.

Write and read station 32 and 34, very similar in nature, include electromagnetic heads 42, 44, each comparing a pair of elements, one associated with clock track 50 on tape 36 and the other associated with data track 54. Head 42 is energized by write circuits 20 through line 46 and 47 to provide a longitudinal recording of serial bits in each track 54, 50, respectively, whereas head 44 is activated by the recordings made by head 42 to energize read circuits 30 through line 48, 49 respectively. As shown, tape drive control 24 determines the motion of tape 36 by controlling a system of motors, capstans and rollers described in the copending U.S. Pat. application Ser. No. 677,526 filed Oct. 24, 1967 sufficiently to obviate additional description here, by responding to clock signal C1 received on line 22, a signal on line 147 from error-checking circuits 31 (to be described later) and signals from limit switches 52, 56 which indicate depletion of tape supply in bins 38, 40, respectively.

When tape 36 is in motion, the recorded clock signal is sensed by head 44, converted to clock signal C2 by read circuits 30, a clamped square wave with which the tape unit basic timing logic is in synchronism. However, since signal C2 is generated only when tape 36 is in motion, provision is made to substitute an auxiliary source of square wave pulses for supplying the components of the tape unit when the tape is not moving; this source is multivibrator 74 which continuously generates clock signal C0.

Figure 2:
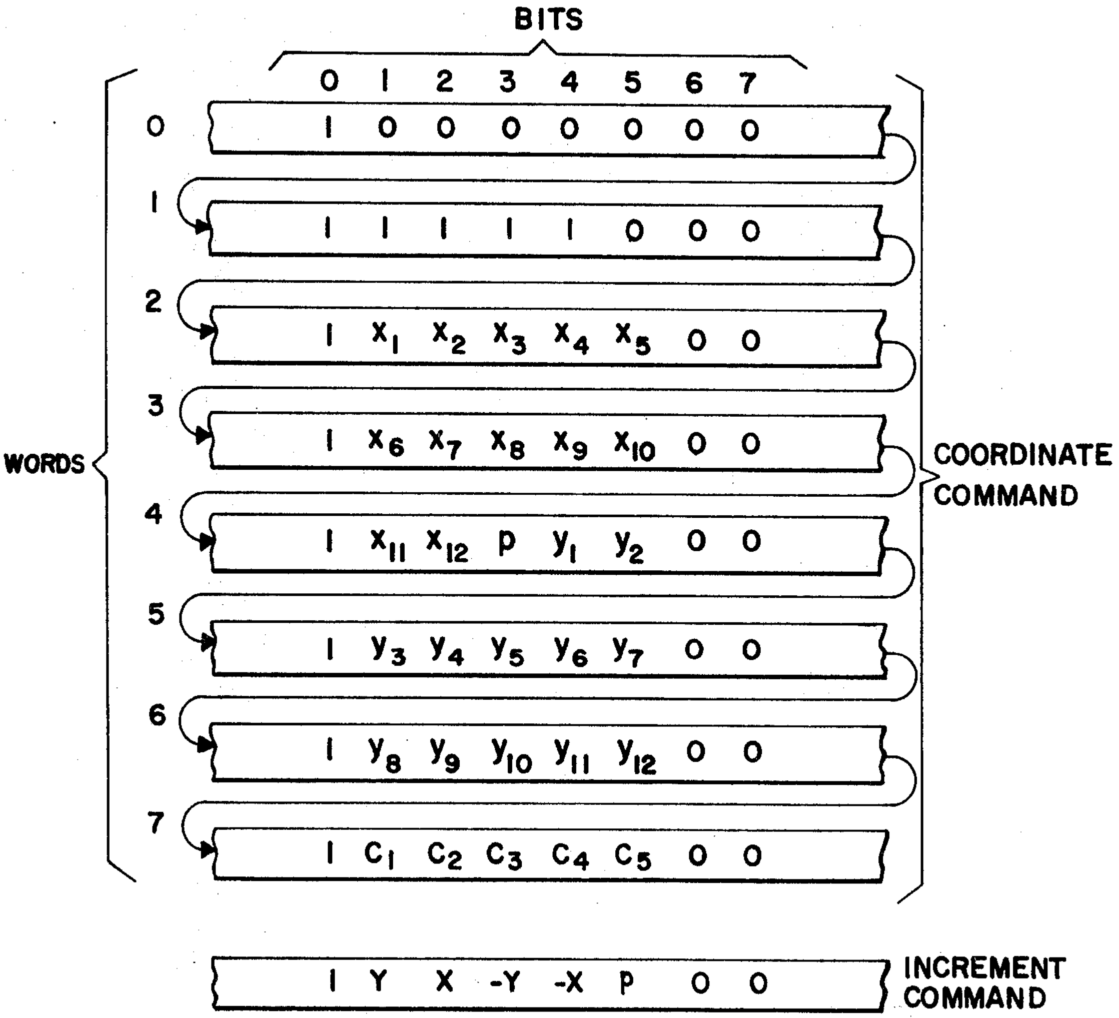
FIG. 2 presents the command format as recorded on the tape.

FIG. 2 shows the tape unit command formats, both coordinate and increment, as recorded on tape 36.

The coordinate command comprises eight words, each containing 8 bits, having the following significance.

Word 0 comprises a start code to insure synchronism prior to the data; word 1 is a bit combination which is recognized by plotter 14 to signify one or more modes of operation: that the next five words designate the X, Y position, that one of a plurality of plotters is to respond, or other modes as programmed; words 2, 3, 4, 5, and 6 provide 24 bits of pen coordinate data; and word 7 is a check sum generated by the "exclusive-OR" sum of the respective bits of words 2 through 6.

The increment command comprises one word of eight bits in which bits 1 and 2 call for positive pen increments along the ordinate and abscissa respectively, while bits 3 and 4 call for negative pen increments along the ordinate and abscissa, respectively.

Bit 3 of word 4 of the coordinate command and bit 5 of the increment command, indicated as $p$, permits the computer program to specify if the repositioning (if any) is to be accomplished with the pen up ($p$=1) or down ($p$=0).

For all words, bit 0 is always a 1 and bits 6 and 7 are always 0.

Figure 3:
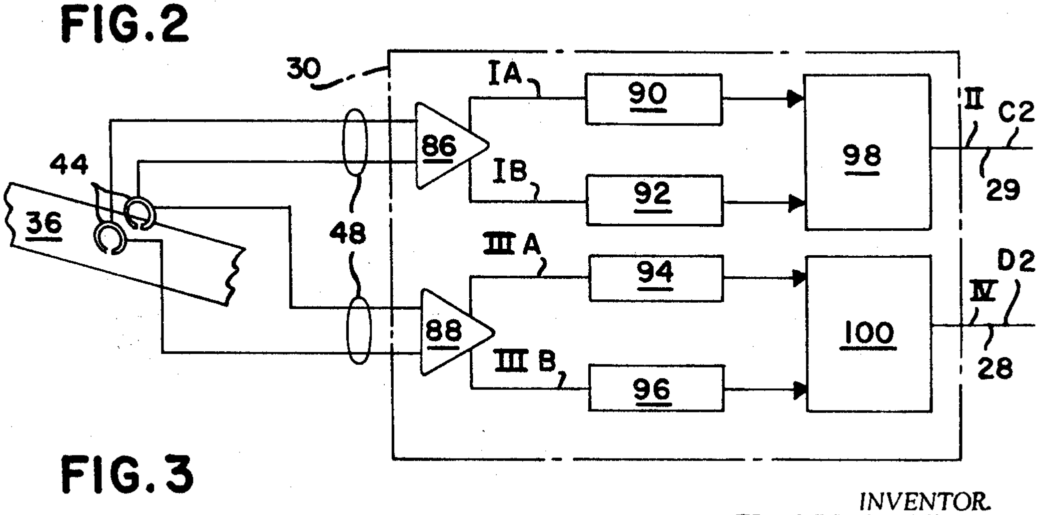
FIG. 3 is a block diagram of the write circuitry of FIG. 1.
Figure 4:
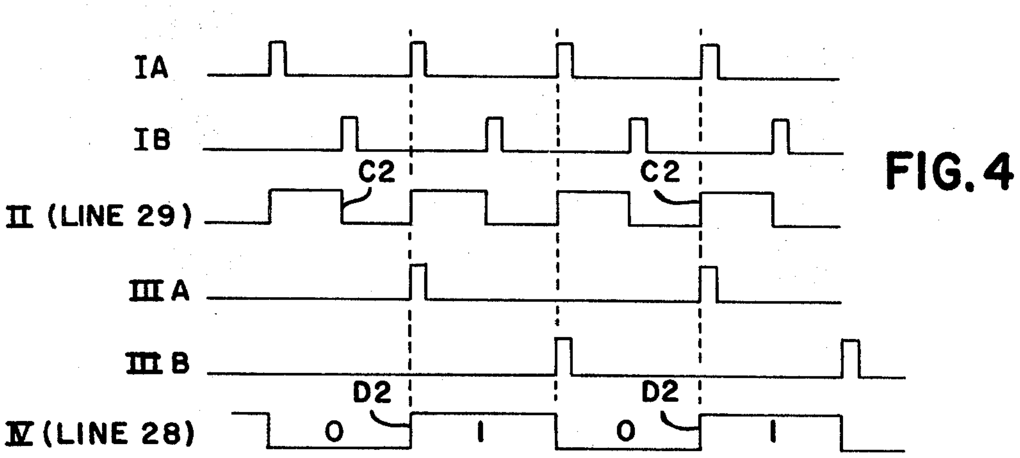
FIG. 4 is a waveshape diagram depicting typical activity of some of the circuits of FIG. 3.

FIG. 3, a block diagram of read circuits 30 of FIG. 1, is seen to utilize components familiar in computer technology. Thus, the windings of the elements of head 44 connect across the input of amplifiers 86, 88, the outputs of which (graphs IA, IB, IIIA and IIIB of FIG. 4), are squared by shapers 90, 92, 94, 96 and fed to the inputs of R–S flip-flops 98, 100. The output of flip-flop 98, on line 29 (graph II of FIG. 4), comprises the symmetrical square wave clock signal C2 whereas the output of flip-flop 100, on line 28 (graph IV of FIG. 4), comprises the NRZ data signal D2 having the configuration shown corresponding to a recorded sequence of alternating 0 and 1 bits.

Figure 5:
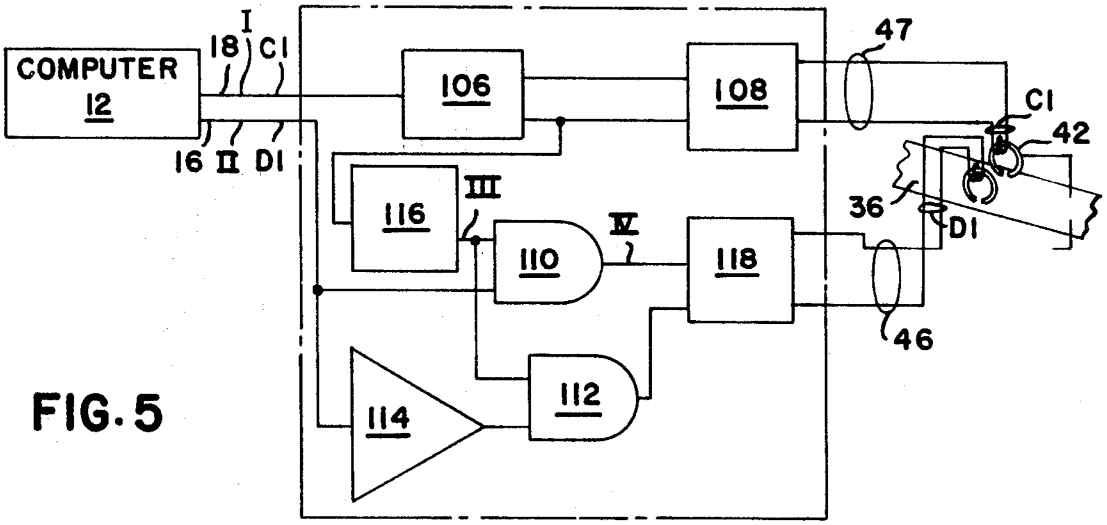
FIG. 5 is a block diagram of the read circuitry of FIG. 1.
Figure 6:
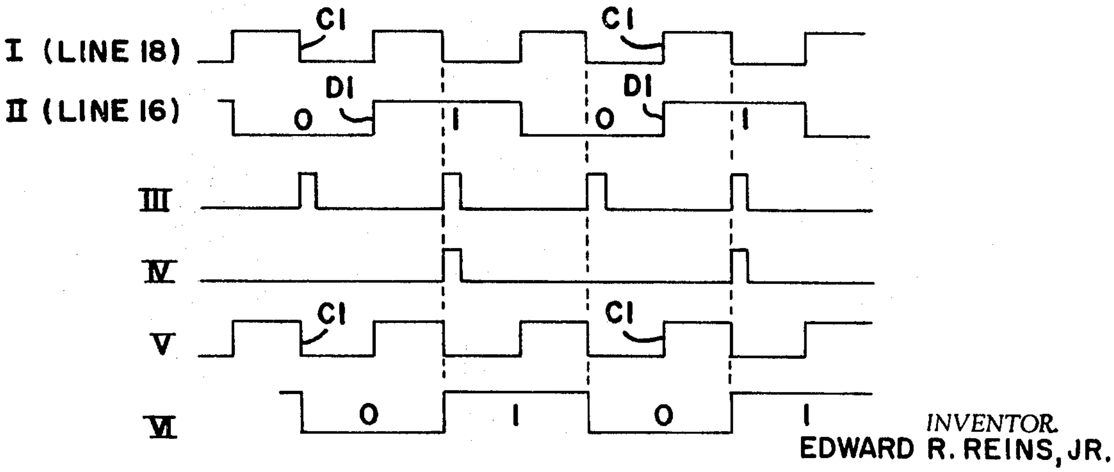
FIG. 6 is a waveshape diagram depicting typical activity of some of the circuits of FIG. 5.

FIG. 5 presents a block diagram of write circuits 20 of FIG. 1 and is also seen to comprise components familiar in computer technology. Computer 12 connects by way of a pair of lines 18 and 16, the former of which carries the symmetrical clock signal C1 (graph I of FIG. 6) which is squared by shaper 106, and fed to R–S flip-flop 108. Data from computer 12, on line 16, preferably is NRZ in form and, to represent a sequence of alternating 0 and 1 bits, would take the configuration of graph II of FIG. 6. Data D1 is fed to AND gate 110 and, after inversion by inverter 114, to AND gate 112. The other inputs to AND gates 110, 112 is provided by one-shot 116 which is triggered by an output of shaper 106 (clock signal C1) to generate a short pulse at clock period intervals (graph III of FIG. 6). The outputs of AND gates 110, 112 (the former is shown in graph IV of FIG. 6) in turn, trigger R–S flip-flop 118. The outputs of flip-flop 108 and 118 are fed on lines 47, 45 to respective writing elements of head 42. As may be seen from graph VI of FIG. 6, the recorded data signal is of the same configuration as received data signal D1.

Some remarks have already been made above concerning the error-checking system incorporated in the present invention; it has been intimated that the method maintains plotting speed, is effective against single errors or an error burst and provides correction so that errors are not propagated through the graph. These advantages are achieved, not be repeating increment commands (i.e., by redundancy), but by periodically injecting a coordinate command specifying the correct X, Y coordinates into the increment command stream. The tape unit compares the present pen coordinates to the coordinate command data and corrects the pen position if so indicated. Thus, errors may be detected and corrected almost as quickly as they occur. The frequency with which coordinate commands are injected depends upon the noise characterizing the transmission channel, and may be varied by the computer program to tune the total system to the transmission channel characteristics.

The error-checking system, illustrated in the block diagram of FIG. 7, operates, in a general way, as follows.

The incrementing signals called for by the increment commands and, fed to the X and Y stepping motors of the plotter, are also stored in X and Y position accumulators. These accumulators are initially set to zero at the beginning of the plot, and count up for coordinate increments and count down for coordinate decrements; therefore, if there are no errors, each accumulator would contain the correct X and Y coordinate of the pen position at any given instant. If increment demands are missed, however, then the coordinates stored by the accumulators are considered incorrect. The X and Y coordinate values carried in coordinate commands are used to reposition the pen and to update the accumulators.

However, before a coordinate command can be used, it must itself be checked for accuracy. This is accomplished by means of the check sum recorded in word 7 of the command format shown in FIG. 2. If the parity is correct, both accumulator sums are compared to the corresponding position values contained in the coordinate command. If they do not agree, drive control 24 is caused to stop tape 36, a local clock feeds stepping pulses (i.e., generates correction commands) to the plotter and accumulators until the differences become zero. If the parity is not correct, no correction is made and plotting continues until a correct coordinate command is received, at which time the plotter pen is repositioned to agree with the coordinates contained therein.

Figure 7:
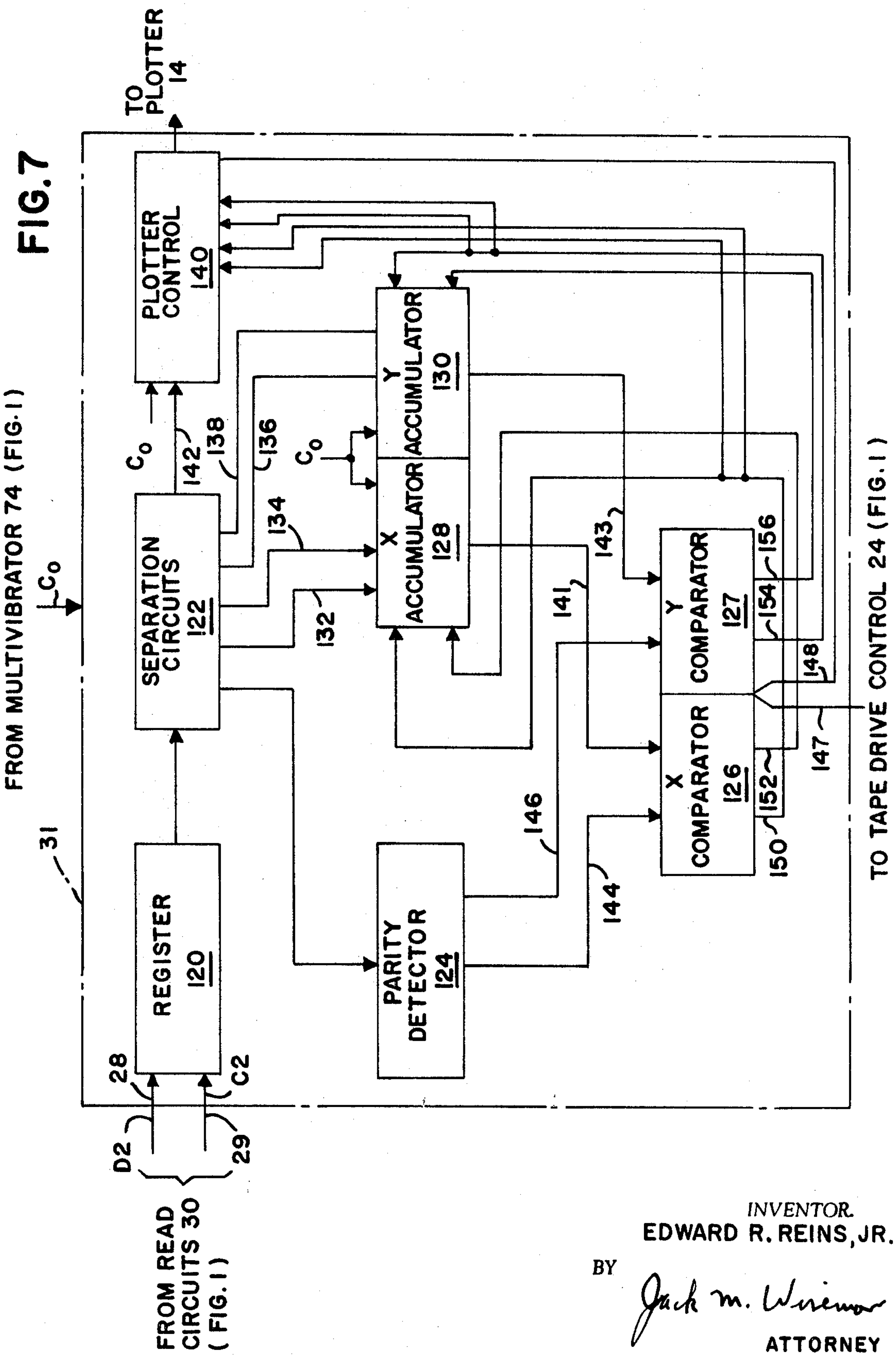
FIG. 7 is a block diagram of the error checking circuitry incorporated in the unit of FIG. 1.

Referring now to FIG. 7, it is seen that read circuits 30 (FIG. 1) feed data signal D2 and clock signal C2 to error-checking circuits 31 where they are received by register 120.

The eight-bit words making up the commands are individually transferred by register 120 to separation circuits 122 which comprises logic capable of recognizing whether the word origin is a coordinate or increment command.

If separation circuits 122 identify a coordinate command, transfer is made to parity detector 124 where bits 1 through 5 of the coordinate command words 2 through 6 (FIG. 2) are summed and the bit sums are each compared with the respective check bit of word 7. If parity agrees in every case, the 12 coordinate bits are transferred to comparators 126, 127, as follows: bits 1 through 5 of words 1 and 3 and bits 1 and 2 of word 4 to X comparator 126 on lines 144 and bits 4 and 5 of word 4 and bits 1 through 5 of words 5 and 6 to Y comparator 127 on lines 146. However, if there is any parity discrepancy, the above transfer in inhibited to thereby preclude any system response to an incorrect coordinate command.

If separation circuits 122 identify an increment command, the command is transferred to plotter control 140 on line 142 and a pulse is entered into accumulators 128, 130, as follows: on line 132 if bit 2 contains a binary 1, on line 134 if bit 4 contains a binary 1, on line 136 if bit 1 contains a binary 1 and on line 138 if bit 3 contains a binary 1. Pulses on lines 132, 136 direct positive increments (counts up) in accumulators 128, 130, respectively, whereas pulses on lines 134, 138 direct respective negative increments (counts down), to thereby provide, in the accumulators, sums representing the present position of the plotter pen. These sums are transferred to comparators 126, 127 on line 141 from X accumulator 128 to X comparator 126 and on line 143 from Y accumulator 130 to Y comparator 127.

As a result of the above activity, comparators 126, 127 have, as inputs, sums representing plotter pen increment pulses transmitted on line 142 and numbers representing the proper coordinates of the pen position as programmed onto a correct coordinate command. The respective comparisons are made and, if a condition of equality in each case results, a gate signal is generated on line 148 to direct plotter control 140 to pass the increment data on line 142 to plotter 14. However, if a condition of inequality in either case results, the following takes place. A pulse is transmitted on line 147 to tape drive control 24 to cause tape 36 at read station 34 to stop, to reverse a small predetermined distance and to stop again. If x comparator 126 indicates that the line 141 input is less than the line 144 input, countup pulses appear on line 150 until equality is established, whereas, if the opposite inequality in indicated, countdown pulses appear on line 152 until equality is established; similar activity characterizes Y comparator 127 and lines 143, 154 (countup) and 156 (countdown). As shown, lines 150, 152, 154 and 156 also feed into plotter control 140 in order that the actual plotter pen position be changed as accumulators 128 and 130 are updated. When the updating is completed, a pulse is again transmitted on line 147 to cause tape 36 to restart its forward motion.

While the invention has been shown and described with reference to a preferred embodiment thereof, it will be understood by those skilled in the art that various changes in form may be made without departing from its spirit and scope.

What is claimed is:

1. A buffer system for use between a source of digital signals and an incremental plotter responsive to such signals, the source capable of transmitting commands directing the plotter increments interleaved with commands indicating the correct plot coordinator and the plotter responsive to increments commands only, comprising:
   - means to distinguish between the two types of command;
   - means responsive to said distinguishing means to transmit increment commands to the plotter;
   - accumulators responsive to said distinguishing means to generate counts representing the sums of sequential increment commands; comparators responsive to said distinguishing means and said accumulators to compare the coordinates of the coordinate command of said distinguishing means with the counts of said accumulators;
   - gating means for said transmitting means operative as an equality condition of said comparators; and
   - updating means for said accumulators operative as an inequality condition of said comparators to provide agreement of the counts thereof with the coordinates of the coordinate command.

2. The system of claim 1 and means responsive to said updating means to generate correction increment commands to the plotter.

3. The system of claim 2 and means responsive to said parity detector to inhibit operation of said transmitting means.